(12) United States Patent
Huang et al.

(10) Patent No.: US 11,374,434 B2
(45) Date of Patent: Jun. 28, 2022

(54) RADIO FREQUENCY ENERGY-HARVESTING APPARATUS

(71) Applicants: DELTA ELECTRONICS, INC., Taoyuan County (TW); National Cheng Kung University, Tainan (TW)

(72) Inventors: Tzuen-Hsi Huang, Tainan (TW); Sheng-Fan Yang, Tainan (TW); Chun-Cheng Chen, Tainan (TW); Pei-Jung Chung, Taoyuan County (TW); Chun-Yi Lu, Taoyuan County (TW)

(73) Assignees: DELTA ELECTRONICS, INC., Taoyuan (TW); NATIONAL CHENG KUNG UNIVERSITY, Tainan (TW)

( * ) Notice: Subject to any disclaimer, the term of this patent is extended or adjusted under 35 U.S.C. 154(b) by 346 days.

(21) Appl. No.: 16/664,284

(22) Filed: Oct. 25, 2019

(65) Prior Publication Data

US 2020/0059116 A1    Feb. 20, 2020

Related U.S. Application Data

(62) Division of application No. 14/955,301, filed on Dec. 1, 2015, now abandoned.

(30) Foreign Application Priority Data

Oct. 14, 2015 (TW) ................. 104133681

(51) Int. Cl.
*H02J 50/20* (2016.01)
*G01S 13/75* (2006.01)

(52) U.S. Cl.
CPC .............. *H02J 50/20* (2016.02); *G01S 13/75* (2013.01)

(58) Field of Classification Search
CPC ....................................... G01S 13/75
See application file for complete search history.

(56) References Cited

U.S. PATENT DOCUMENTS 5,355,138 A * 10/1994 Cances ............... H04B 7/2041
                                                      455/12.1
5,812,084 A *  9/1998 Bonanni .................. H01Q 3/26
                                                        342/174

(Continued)

FOREIGN PATENT DOCUMENTS

CN     101833091      9/2010
CN     102043151      5/2011

(Continued)

OTHER PUBLICATIONS

Office Action dated Aug. 30, 2018 from corresponding application No. CN 201510661055.1.

*Primary Examiner* — Marcus E Windrich
(74) *Attorney, Agent, or Firm* — Hauptman Ham, LLP (57) ABSTRACT

A radio frequency energy-harvesting apparatus is applied to a radio frequency energy-transmitting apparatus with a location detection function. The radio frequency energy-harvesting apparatus includes a direct current signal receiving-processing unit, a rectification and harmonic generation unit, and a radar wave receiving-transmitting unit. The rectification and harmonic generation unit is electrically connected to the direct current signal receiving-processing unit. The radar wave receiving-transmitting unit is electrically connected to the rectification and harmonic generation unit. The radio frequency energy-transmitting apparatus transmits a radar wave scanning to a space; after the radar wave receiving-transmitting unit receives the radar wave, according to the radar wave, the radar wave receiving-transmitting unit generates an alternating current signal; the radar wave receiving-transmitting unit transmits the alter- (Continued)

nating current signal to the rectification and harmonic generation unit; the rectification and harmonic generation unit generates a radar reflection harmonic wave and a direct current signal.

5 Claims, 4 Drawing Sheets

(56) References Cited

U.S. PATENT DOCUMENTS

| | | | | |
|---|---|---|---|---|
| 9,489,813 | B1* | 11/2016 | Beigel | G01S 5/00 |
| 2008/0048833 | A1* | 2/2008 | Oliver | H04L 25/062 |
| | | | | 340/10.3 |
| 2010/0207738 | A1* | 8/2010 | Bloy | G08B 13/2462 |
| | | | | 342/368 |
| 2012/0306683 | A1* | 12/2012 | Viikari | G01S 13/756 |
| | | | | 342/51 |
| 2013/0058380 | A1* | 3/2013 | Kim | H02J 50/80 |
| | | | | 455/434 |
| 2013/0280033 | A1* | 10/2013 | Babbitt | F04D 15/0066 |
| | | | | 415/16 |
| 2015/0169910 | A1* | 6/2015 | Koch | G06K 7/10415 |
| | | | | 340/10.1 |
| 2016/0103198 | A1* | 4/2016 | Swope | G01S 13/68 |
| | | | | 342/372 |
| 2017/0111095 | A1* | 4/2017 | Maltsev | H04B 7/063 |

FOREIGN PATENT DOCUMENTS

| | | |
|---|---|---|
| CN | 104375135 | 2/2015 |
| DE | 102006027824 | 12/2007 |

* cited by examiner

RADIO FREQUENCY ENERGY-HARVESTING APPARATUS

CROSS-REFERENCE TO RELATED APPLICATION

This application is a divisional application of U.S. patent application Ser. No. 14/955,301 filed on Dec. 1, 2015 and entitled "RADIO FREQUENCY ENERGY-TRANSMITTING APPARATUS WITH LOCATION DETECTION FUNCTION AND RADIO FREQUENCY ENERGY-HARVESTING APPARATUS AND RADIO FREQUENCY ENERGY-TRANSMITTING METHOD WITH LOCATION DETECTION FUNCTION.", which claims priority to TW104133681 filed Oct. 14, 2015. The entire disclosures of the above applications are all incorporated herein by reference.

BACKGROUND OF THE INVENTION

Field of the Invention

The present invention relates to an energy-transmitting apparatus, an energy-harvesting apparatus and an energy-transmitting method, and especially relates to a radio frequency energy-transmitting apparatus with a location detection function, a radio frequency energy-harvesting apparatus and a radio frequency energy-transmitting method with the location detection function.

Description of the Related Art

The related art wireless signal energy-harvesting system at least has following disadvantages:

1. The wireless signals transmitted by most of the related art radio frequency energy-transmitting apparatuses (for examples, the radio or telecom base station) is ominidirectional, so that the energy density at the location of the related art radio frequency energy-harvesting apparatus is possibly not high enough, so that the conversion efficiency of the related art radio frequency energy-harvesting apparatus is low.

2. The wireless signal transmitted by some of the related art radio frequency energy-transmitting apparatuses is directional to the location of the related art radio frequency energy-harvesting apparatus, but the location indicator component with higher power consumption has to be arranged in the related art radio frequency energy-harvesting apparatus. For example, locating the related art radio frequency energy-harvesting apparatus can be achieved by the GPS, Beacon or Wi-Fi communication components. However, the location indicator component with higher power consumption does not accord with the spirit of the energy-harvesting apparatus.

SUMMARY OF THE INVENTION

In order to solve the above-mentioned problems, the first object of the present invention is to provide a radio frequency energy-transmitting apparatus with a location detection function.

In order to solve the above-mentioned problems, the second object of the present invention is to provide a radio frequency energy-harvesting apparatus.

In order to solve the above-mentioned problems, the third object of the present invention is to provide a radio frequency energy-transmitting method with the location detection function.

In order to achieve the first object of the present invention mentioned above, the radio frequency energy-transmitting apparatus is applied to a radio frequency energy-harvesting apparatus. The radio frequency energy-transmitting apparatus comprises a harmonic radar unit and a harmonic radar control unit electrically connected to the harmonic radar unit. The harmonic radar unit transmits a radar wave scanning to a space. After the radio frequency energy-harvesting apparatus receives the radar wave, according to the radar wave, the radio frequency energy-harvesting apparatus generates a radar reflection harmonic wave. A frequency of the radar reflection harmonic wave is different from a frequency of the radar wave. The radio frequency energy-harvesting apparatus transmits the radar reflection harmonic wave. After the harmonic radar unit receives the radar reflection harmonic wave, according to the radar reflection harmonic wave, the harmonic radar control unit determines a location of the radio frequency energy-harvesting apparatus. According to the location of the radio frequency energy-harvesting apparatus, the harmonic radar control unit controls the harmonic radar unit, so that a radar wave beam of the radar wave transmitted from the harmonic radar unit is directed toward the location of the radio frequency energy-harvesting apparatus.

Moreover, the frequency of the radar reflection harmonic wave is an integral multiple frequency of the radar wave.

Moreover, the frequency of the radar reflection harmonic wave is a double frequency of the radar wave.

Moreover, the radio frequency energy-transmitting apparatus is further applied to a power source. The harmonic radar unit comprises a power divider, a switchable phase delay module and an antenna array. The power divider is electrically connected to the power source. The switchable phase delay module is electrically connected to the power divider and the harmonic radar control unit. The antenna array is electrically connected to the switchable phase delay module. The power source transmits a power to the power divider. The power divider splits the power into some equal parts and transmits the equal power to each individual delay path in the switchable phase delay module. According to the location of the radio frequency energy-harvesting apparatus, the harmonic radar control unit controls the switchable phase delay module to control a phase of the power, so that the radar wave beam of the radar wave transmitted from the antenna array is directed toward the location of the radio frequency energy-harvesting apparatus.

Moreover, the harmonic radar control unit comprises a harmonic radar control circuit and a location determination circuit. The harmonic radar control circuit is electrically connected to the switchable phase delay module. The location determination circuit is electrically connected to the harmonic radar control circuit. The harmonic radar unit further comprises a harmonic receiving antenna and a harmonic power detector electrically connected to the harmonic receiving antenna and the location determination circuit. After the location determination circuit receives the radar reflection harmonic wave through the harmonic receiving antenna and the harmonic power detector, according to a comparative result between an intensity of the radar reflection harmonic wave and an intensity of a background harmonic noise, the location determination circuit determines whether the radio frequency energy-harvesting apparatus exists or not, to generate a location signal related with the location of the radio frequency energy-harvesting apparatus. The location determination circuit transmits the location signal to the harmonic radar control circuit.

Moreover, the harmonic radar control unit controls the switchable phase delay module by an analog modulation control mode.

In order to achieve the second object of the present invention mentioned above, the radio frequency energy-harvesting apparatus is applied to a radio frequency energy-transmitting apparatus with a location detection function. The radio frequency energy-harvesting apparatus comprises a direct current signal receiving-processing unit, a rectification and harmonic generation unit and a radar wave receiving-transmitting unit. The rectification and harmonic generation unit is electrically connected to the direct current signal receiving-processing unit. The radar wave receiving-transmitting unit is electrically connected to the rectification and harmonic generation unit. The radio frequency energy-transmitting apparatus transmits a radar wave scanning to a space. After the radar wave receiving-transmitting unit receives the radar wave, according to the radar wave, the radar wave receiving-transmitting unit generates an alternating current signal. The radar wave receiving-transmitting unit transmits the alternating current signal to the rectification and harmonic generation unit. The rectification and harmonic generation unit generates a radar reflection harmonic wave and a direct current signal. A frequency of the radar reflection harmonic wave is different from a frequency of the radar wave. The rectification and harmonic generation unit transmits the radar reflection harmonic wave to the radio frequency energy-transmitting apparatus through the radar wave receiving-transmitting unit. The rectification and harmonic generation unit transmits the direct current signal to the direct current signal receiving-processing unit.

Moreover, the frequency of the radar reflection harmonic wave is an integral multiple frequency of the radar wave.

Moreover, the frequency of the radar reflection harmonic wave is a double frequency of the radar wave.

Moreover, the radar wave receiving-transmitting unit comprises a matching circuit electrically connected to the rectification and harmonic generation unit. After the radar wave receiving-transmitting unit receives the radar wave, according to the radar wave, the matching circuit processes the radar wave by a matching process to generate the alternating current signal. The matching circuit transmits the alternating current signal to the rectification and harmonic generation unit.

Moreover, the radar wave receiving-transmitting unit further comprises a first selection switch and a second selection switch. The first selection switch is electrically connected to the matching circuit. The second selection switch is electrically connected to the matching circuit and the rectification and harmonic generation unit.

Moreover, the matching circuit comprises a harmonic optimization matching sub-circuit and an energy-harvesting optimization matching sub-circuit. The harmonic optimization matching sub-circuit is electrically connected to the first selection switch and the second selection switch. The energy-harvesting optimization matching sub-circuit is electrically connected to the first selection switch and the second selection switch. If the direct current signal is less than a predetermined value, the first selection switch and the second selection switch are controlled, so that the harmonic optimization matching sub-circuit receives the radar wave. If the direct current signal is greater than or equal to the predetermined value, the first selection switch and the second selection switch are controlled, so that the energy-harvesting optimization matching sub-circuit receives the radar wave.

Moreover, the radar wave receiving-transmitting unit further comprises a radar wave receiving antenna and a harmonic transmitting antenna. The radar wave receiving antenna is electrically connected to the first selection switch. The harmonic transmitting antenna is electrically connected to the second selection switch and the rectification and harmonic generation unit. The radar wave receiving antenna receives the radar wave and transmits the radar wave to the matching circuit through the first selection switch. The rectification and harmonic generation unit transmits the radar reflection harmonic wave to the radio frequency energy-transmitting apparatus through the harmonic transmitting antenna.

Moreover, the rectification and harmonic generation unit is a bridge rectifier. Moreover, the radio frequency energy-harvesting apparatus further comprises a low pass filter and a selection switch controller. The low pass filter is electrically connected to the rectification and harmonic generation unit and the direct current signal receiving-processing unit. The selection switch controller is electrically connected to the low pass filter, the first selection switch and the second selection switch. The selection switch controller controls the first selection switch and the second selection switch.

Moreover, the radar wave receiving antenna and the harmonic transmitting antenna can be integrated as a dual-mode antenna electrically connected to the first selection switch. In order to achieve the third object of the present invention mentioned above, the radio frequency energy-transmitting method comprises following steps. A harmonic radar unit transmits a radar wave scanning to a space. After a radio frequency energy-harvesting apparatus receives the radar wave, according to the radar wave, the radio frequency energy-harvesting apparatus generates a radar reflection harmonic wave. A frequency of the radar reflection harmonic wave is different from a frequency of the radar wave. The radio frequency energy-harvesting apparatus transmits the radar reflection harmonic wave. After the harmonic radar unit receives the radar reflection harmonic wave, according to the radar reflection harmonic wave, a harmonic radar control unit determines the location of the radio frequency energy-harvesting apparatus. According to the location of the radio frequency energy-harvesting apparatus, the harmonic radar control unit controls the harmonic radar unit, so that a radar wave beam of the radar wave transmitted from the harmonic radar unit is directed toward the location of the radio frequency energy-harvesting apparatus.

Moreover, the frequency of the radar reflection harmonic wave is an integral multiple frequency of the radar wave.

Moreover, the harmonic radar unit scans and records a set of power intensities data of a plurality of radar reflected harmonic waves. If the power intensity of the radar reflected harmonic wave is greater than a background harmonic power intensity a power predetermined value (for example, 3 dBm), the harmonic radar unit determines that the radar electric wave is the radar reflection harmonic wave.

Moreover, if the power intensity of the radar reflected harmonic wave is not greater than the background harmonic power intensity the power predetermined value, the harmonic radar unit determines that the radar reflected harmonic wave is not the radar reflection harmonic wave, and then the harmonic radar unit neglect the radar reflected harmonic wave.

The present invention has at least following advantages:

1. The radar wave beam of the radar wave transmitted from the radio frequency energy-transmitting apparatus is directed toward the location of the radio frequency energy-harvesting apparatus, so that the energy density of the location of the radio frequency energy-harvesting apparatus is higher, so that the radio frequency energy-harvesting apparatus obtains higher energy.

2. According to the concept of the radar reflection harmonic wave, the radio frequency energy-transmitting apparatus can detect the location of the radio frequency energy-harvesting apparatus easily, so that the circuit structure of the radio frequency energy-harvesting apparatus is simple and energy is saved to accord with the concept of the energy-harvesting apparatus. The present invention does not need the GPS, Beacon or Wi-Fi communication components to locate the radio frequency energy-harvesting apparatus.

DETAILED DESCRIPTION OF THE INVENTION

Please refer to following detailed description and figures for the technical content of the present invention. The following detailed description and figures are referred for the present invention, but the present invention is not limited to it.

Figure 1:
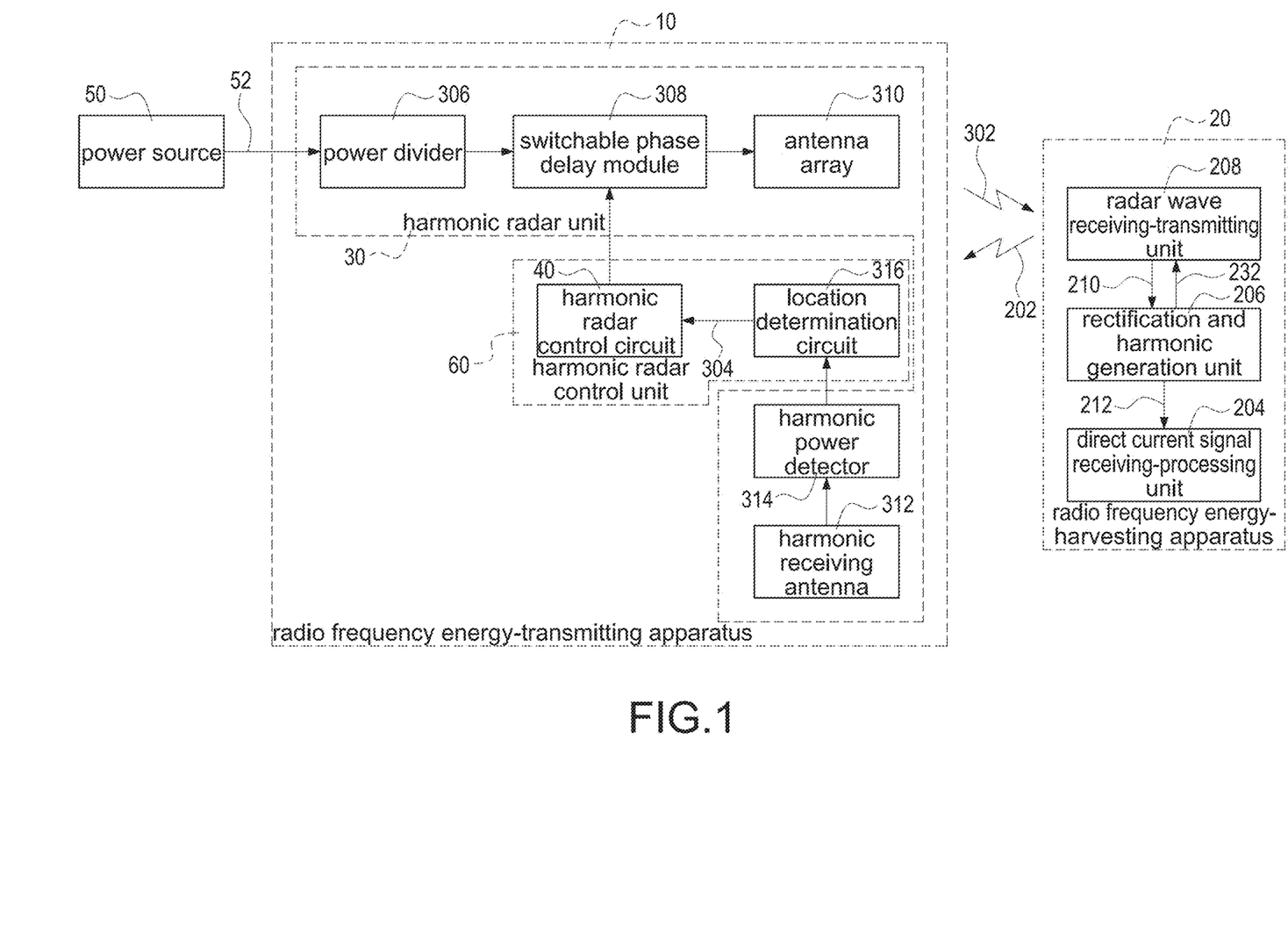
FIG. 1 shows a block diagram of the radio frequency energy-transmitting apparatus and the radio frequency energy-harvesting apparatus of the present invention.

FIG. 1 shows a block diagram of the radio frequency energy-transmitting apparatus and the radio frequency energy-harvesting apparatus of the present invention. A radio frequency energy-transmitting apparatus 10 with a location detection function is applied to a radio frequency energy-harvesting apparatus 20 and a power source 50. The radio frequency energy-transmitting apparatus 10 comprises a harmonic radar unit 30 and a harmonic radar control unit 60. The harmonic radar unit 30 comprises a power divider 306, a switchable phase delay module 308, an antenna array 310, a harmonic receiving antenna 312 and a harmonic power detector 314. The harmonic radar control unit 60 comprises a harmonic radar control circuit 40 and a location determination circuit 316.

The harmonic radar control unit 60 is electrically connected to the harmonic radar unit 30. The power divider 306 is electrically connected to the power source 50. The switchable phase delay module 308 is electrically connected to the power divider 306 and the harmonic radar control unit 60. The antenna array 310 is electrically connected to the switchable phase delay module 308. The harmonic power detector 314 is electrically connected to the harmonic receiving antenna 312. The location determination circuit 316 is electrically connected to the harmonic power detector 314 and the harmonic radar control circuit 40.

The harmonic radar unit 30 transmits a radar wave 302 scanning to a space. After the radio frequency energy-harvesting apparatus 20 receives the radar wave 302, according to the radar wave 302, the radio frequency energy-harvesting apparatus 20 generates a radar reflection harmonic wave 202. A frequency of the radar reflection harmonic wave 202 is different from a frequency of the radar wave 302. For example, the frequency of the radar reflection harmonic wave 202 is an integral multiple frequency of the radar wave 302. For another example, the frequency of the radar reflection harmonic wave 202 is a double frequency of the radar wave 302 (for example, the frequency of the radar wave 302 is 915 MHz, and the frequency of the radar reflection harmonic wave 202 is 1830 MHz).

The radio frequency energy-harvesting apparatus 20 transmits the radar reflection harmonic wave 202. After the harmonic radar unit 30 receives the radar reflection harmonic wave 202, according to a comparative result between an intensity of the radar reflection harmonic wave 202 and an intensity of a background harmonic noise, the harmonic radar control unit 60 determines a location of the radio frequency energy-harvesting apparatus 20. According to the location of the radio frequency energy-harvesting apparatus 20, the harmonic radar control unit 60 controls the harmonic radar unit 30, so that a radar wave beam of the radar wave 302 transmitted from the harmonic radar unit 30 is directed toward the location of the radio frequency energy-harvesting apparatus 20.

The power source 50 transmits a power 52 to the power divider 306. The power divider 306 transmits the power 52 to the switchable phase delay module 308 evenly and distributively. According to the location of the radio frequency energy-harvesting apparatus 20, the harmonic radar control unit 40 controls the switchable phase delay module 308 to control a phase of the power 52, so that the radar wave beam of the radar wave 302 transmitted from the antenna array 310 is directed toward the location of the radio frequency energy-harvesting apparatus 20. In another word, different phase delay signal feeding into the antenna will form different antenna array pattern. After designing, the radiation direction of the antenna can be changed. The harmonic radar control circuit 40 controls the switchable phase delay module 308 to control the antenna array 310 by some logic circuits (not shown in FIG. 1).

After the location determination circuit 316 receives the radar reflection harmonic wave 202 through the harmonic receiving antenna 312 and the harmonic power detector 314, according to a comparative result between the intensity of the radar reflection harmonic wave 202 and the intensity of the background harmonic noise, the location determination circuit 316 determines whether the radio frequency energy-harvesting apparatus 20 exists or not, to generate a location signal 304 related with the location of the radio frequency energy-harvesting apparatus 20. The location determination circuit 316 transmits the location signal 304 to the harmonic radar control circuit 40. The location determination circuit 316 is, for example but not limited to, a signal processing unit circuit.

Figure 2:
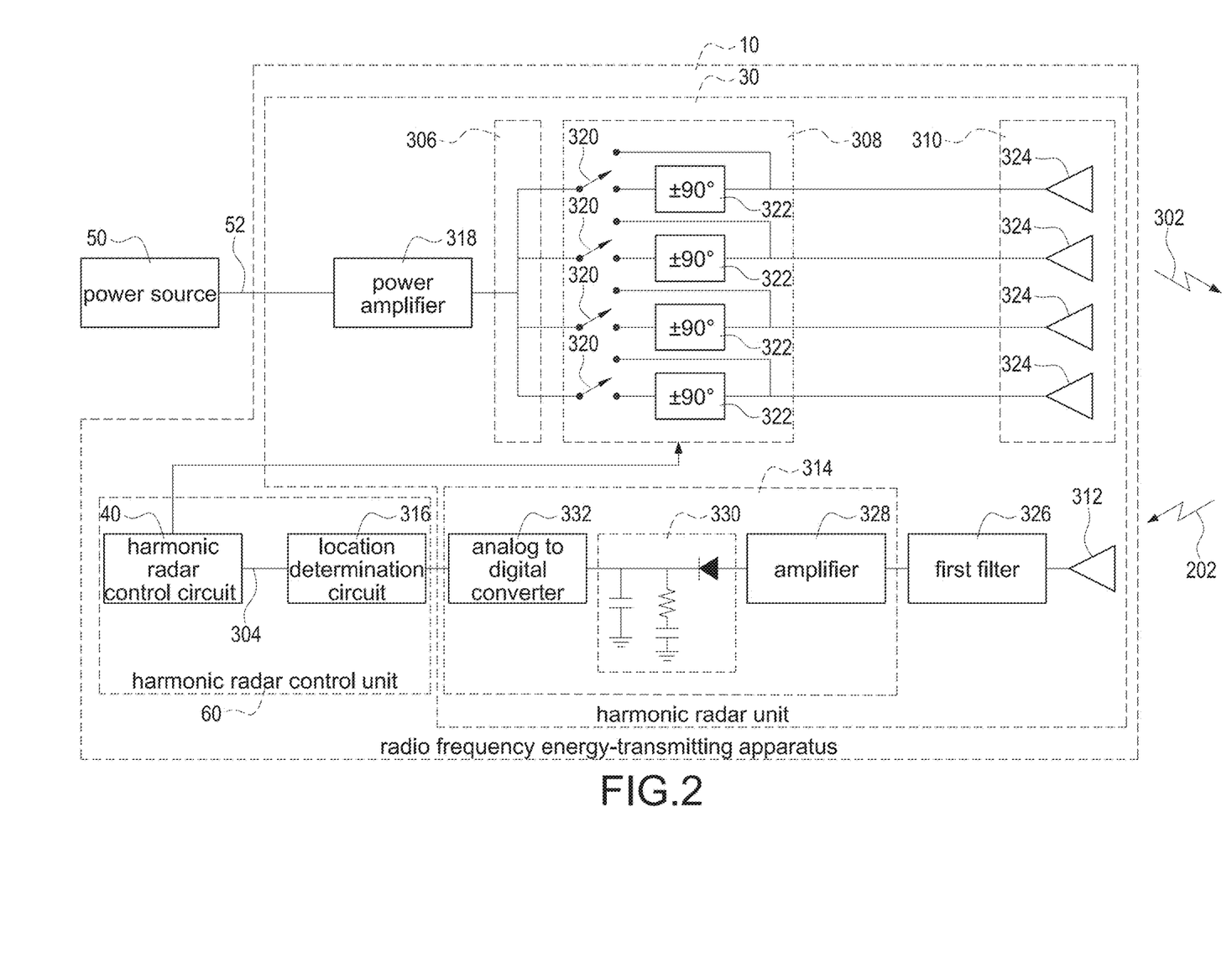
FIG. 2 shows a block diagram of an embodiment of the radio frequency energy-transmitting apparatus of the present invention.

FIG. 2 shows a block diagram of an embodiment of the radio frequency energy-transmitting apparatus of the present invention. Besides the components shown in FIG. 1, the harmonic radar unit 30 further comprises a power amplifier 318 and a first filter 326. The switchable phase delay module 308 comprises a plurality of switch units 320 and a plurality of phase delay units 322. The antenna array 310 comprises a plurality of antenna units 324. The harmonic power detector 314 comprises an amplifier 328, a second filter 330 (such as a low pass filter) and an analog to digital converter 332.

The harmonic radar control circuit 40 controls the switch units 320, so that the phase delay units 322 are turned on or turned off, so that the radar wave beam of the radar wave 302 transmitted from the antenna unit 324 is directed toward the location of the radio frequency energy-harvesting apparatus 20.

The antenna array 310 can be arranged one-dimensionally or two-dimensionally. In the embodiment show in FIG. 2, the antenna array 310 is a 2×2 antenna array. According to the switch units 320 and the phase delay units 322, the phase angle can be the phase delay of 0 degree, +90 degrees or −90 degrees, so that the 2×2 antenna array can generate the radar wave beam with different directions which are determined by the radar reflection harmonic wave 202 of the radio frequency energy-harvesting apparatus 20.

The harmonic radar control unit 60 (or the harmonic radar control circuit 40) controls the switchable phase delay module 308 by a digital modulation control mode. Or when the harmonic radar control unit 60 (or the harmonic radar control circuit 40) is an analog modulation control mode unit, the switchable phase delay module 308 is an analog continuously variable phase delay module. The harmonic radar control unit 60 (or the harmonic radar control circuit 40) controls the switchable phase delay module 308 by an analog modulation control mode.

Please refer to FIG. 1 again. The radio frequency energy-harvesting apparatus 20 is applied to the radio frequency energy-transmitting apparatus 10. The radio frequency energy-harvesting apparatus 20 comprises a direct current signal receiving-processing unit 204, a rectification and harmonic generation unit 206 and a radar wave receiving-transmitting unit 208. The rectification and harmonic generation unit 206 is electrically connected to the direct current signal receiving-processing unit 204. The radar wave receiving-transmitting unit 208 is electrically connected to the rectification and harmonic generation unit 206.

The radio frequency energy-transmitting apparatus 10 transmits the radar wave 302 scanning to the space. After the radar wave receiving-transmitting unit 208 receives the radar wave 302, according to the radar wave 302, the radar wave receiving-transmitting unit 208 generates an alternating current signal 210. The radar wave receiving-transmitting unit 208 transmits the alternating current signal 210 to the rectification and harmonic generation unit 206.

After the rectification and harmonic generation unit 206 receives the alternating current signal 210, according to the alternating current signal 210, the rectification and harmonic generation unit 206 generates a harmonic signal 232 and a direct current signal 212. The rectification and harmonic generation unit 206 transmits the harmonic signal 232 to the radar wave receiving-transmitting unit 208. According to the harmonic signal 232, the radar wave receiving-transmitting unit 208 generates and transmits the radar reflection harmonic wave 202 to the radio frequency energy-transmitting apparatus 10. The rectification and harmonic generation unit 206 transmits the direct current signal 212 to the direct current signal receiving-processing unit 204. After the direct current signal receiving-processing unit 204 receives the direct current signal 212, a backend application apparatus (not shown in FIG. 1) utilizes the energy of the direct current signal 212. This is the concept of the energy-harvesting apparatus.

Figure 3:
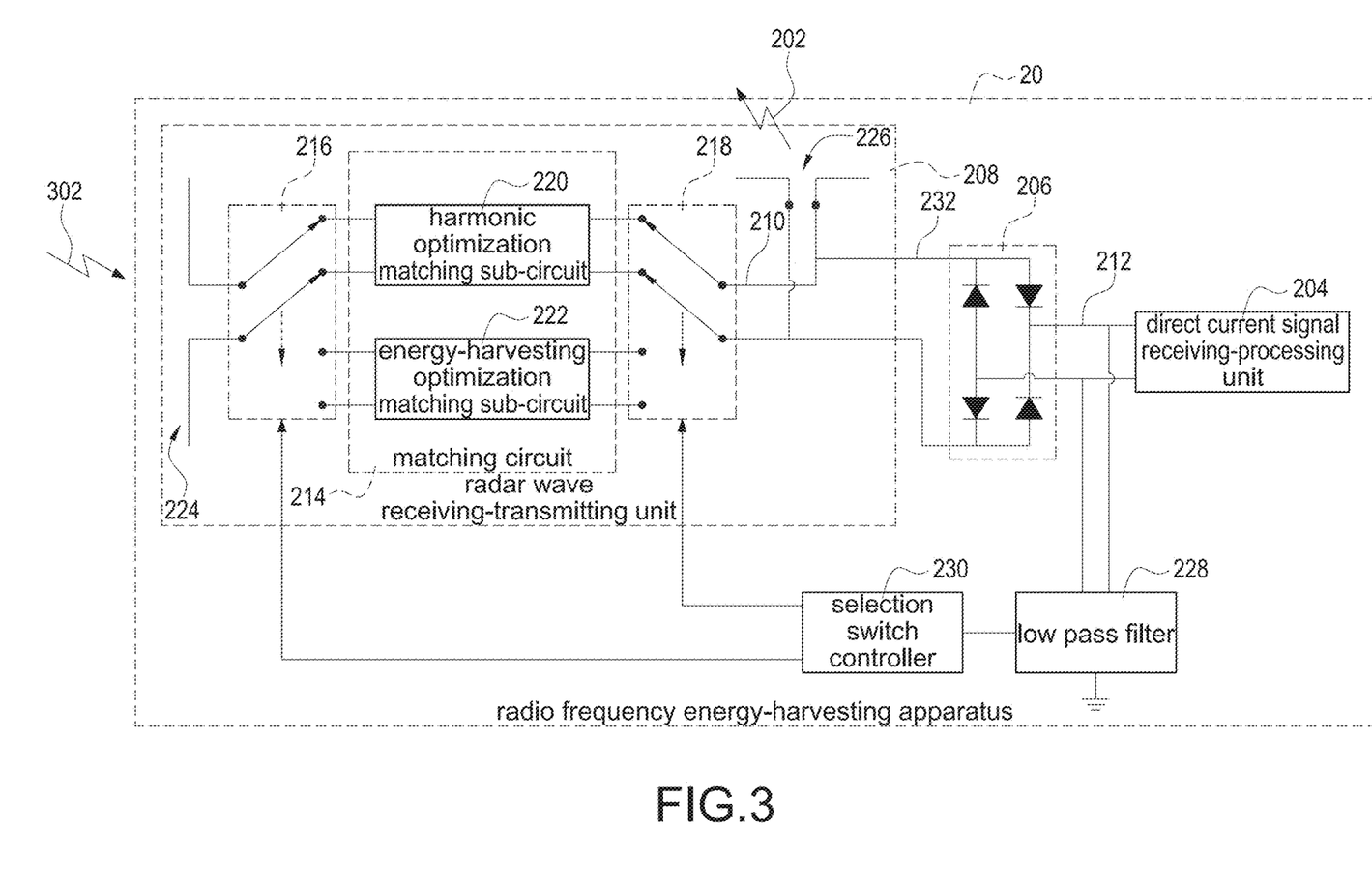
FIG. 3 shows a block diagram of an embodiment of the radio frequency energy-harvesting apparatus of the present invention.

FIG. 3 shows a block diagram of an embodiment of the radio frequency energy-harvesting apparatus of the present invention. Besides the components shown in FIG. 1, the radio frequency energy-harvesting apparatus 20 further comprises a low pass filter 228 and a selection switch controller 230. The radar wave receiving-transmitting unit 208 comprises a matching circuit 214, a first selection switch 216, a second selection switch 218, a radar wave receiving antenna 224 and a harmonic transmitting antenna 226. The matching circuit 214 comprises a harmonic optimization matching sub-circuit 220 and an energy-harvesting optimization matching sub-circuit 222.

The low pass filter 228 is electrically connected to the rectification and harmonic generation unit 206 and the direct current signal receiving-processing unit 204. The selection switch controller 230 is electrically connected to the low pass filter 228, the first selection switch 216 and the second selection switch 218. The matching circuit 214 is electrically connected to the rectification and harmonic generation unit 206. The first selection switch 216 is electrically connected to the matching circuit 214. The second selection switch 218 is electrically connected to the matching circuit 214 and the rectification and harmonic generation unit 206. The radar wave receiving antenna 224 is electrically connected to the first selection switch 216. The harmonic transmitting antenna 226 is electrically connected to the second selection switch 218 and the rectification and harmonic generation unit 206. The harmonic optimization matching sub-circuit 220 is electrically connected to the first selection switch 216 and the second selection switch 218. The energy-harvesting optimization matching sub-circuit 222 is electrically connected to the first selection switch 216 and the second selection switch 218.

After the radar wave receiving-transmitting unit 208 receives the radar wave 302, according to the radar wave 302, the matching circuit 214 processes the radar wave 302 by a matching process to generate the alternating current signal 210. The matching circuit 214 transmits the alternating current signal 210 to the rectification and harmonic generation unit 206.

In an embodiment, if the direct current signal 212 is less than a predetermined value, the first selection switch 216 and the second selection switch 218 are controlled (to connect upwards), so that the harmonic optimization matching sub-circuit 220 receives the radar wave 302. If the direct current signal 212 is greater than or equal to the predetermined value, the first selection switch 216 and the second selection switch 218 are controlled (to connect downwards), so that the energy-harvesting optimization matching sub-circuit 222 receives the radar wave 302.

In another word, in the very beginning, the harmonic optimization matching sub-circuit 220 (for example, having greater reflection coefficient) is utilized, so that the rectification and harmonic generation unit 206 generates better radar reflection harmonic wave 202 (namely, can be identified and detected by the radio frequency energy-transmitting apparatus 10 more easily). After that, the energy-harvesting optimization matching sub-circuit 222 is utilized, so that the rectification and harmonic generation unit 206 has better alternating current to direct current conversion efficiency.

The radar wave receiving antenna 224 receives the radar wave 302 and transmits the radar wave 302 to the matching circuit 214 through the first selection switch 216. The rectification and harmonic generation unit 206 transmits the harmonic signal 232 to the harmonic transmitting antenna 226. According to the harmonic signal 232, the harmonic transmitting antenna 226 generates and transmits the radar reflection harmonic wave 202 to the radio frequency energy-transmitting apparatus 10. The selection switch controller 230 controls the first selection switch 216 and the second selection switch 218.

When the electromagnetic wave touches different interfaces, the reflected wave is generated. The strength of the reflected wave is related with the antenna radiation and the reflection coefficient of the interface. The rectification and harmonic generation unit 206 is, for example but not limited to, a bridge rectifier. When different diode rectification circuit receives the electromagnetic wave, different harmonic waves will be generated by different diode rectification circuits, and then the harmonic waves will be reflected to the space through the antenna.

Please refer to FIG. 1 at the same time. The energy of the second harmonic reflected to the space is determined by the nonlinear rectification characteristics of the diode and the radiation efficiency of the original receiving antenna (namely, the radar wave receiving antenna 224). Utilizing the harmonic wave transmitted to the space by the rectification and harmonic generation unit 206 of the radio frequency energy-harvesting apparatus 20, the radio frequency energy-harvesting apparatus 20 can be deemed as a harmonic signal source, wherein the strength of the harmonic signal source is the greatest when the radar wave beam of the radar wave 302 transmitted from the antenna array 310 is directed toward the location of the radio frequency energy-harvesting apparatus 20.

Therefore, according to the concept of the radar, if the radar wave beam of the radar wave 302 does not scan the radio frequency energy-harvesting apparatus 20, the energy of the harmonic wave received by the harmonic receiving antenna 312 of the radio frequency energy-transmitting apparatus 10 is the lowest (background noise). Conversely, if the radar wave beam of the radar wave 302 just scans the radio frequency energy-harvesting apparatus 20, the energy of the harmonic wave received by the harmonic receiving antenna 312 of the radio frequency energy-transmitting apparatus 10 is the greatest.

The radar wave receiving antenna 224 and the harmonic transmitting antenna 226 can be, for example but not limited to, integrated as a dual-mode antenna (or dual-frequency antenna, such as a yagi antenna). Moreover, the rectification and harmonic generation unit 206 and the radar wave receiving-transmitting unit 208 can be, for example but not limited to, integrated as a rectenna.

Figure 4:
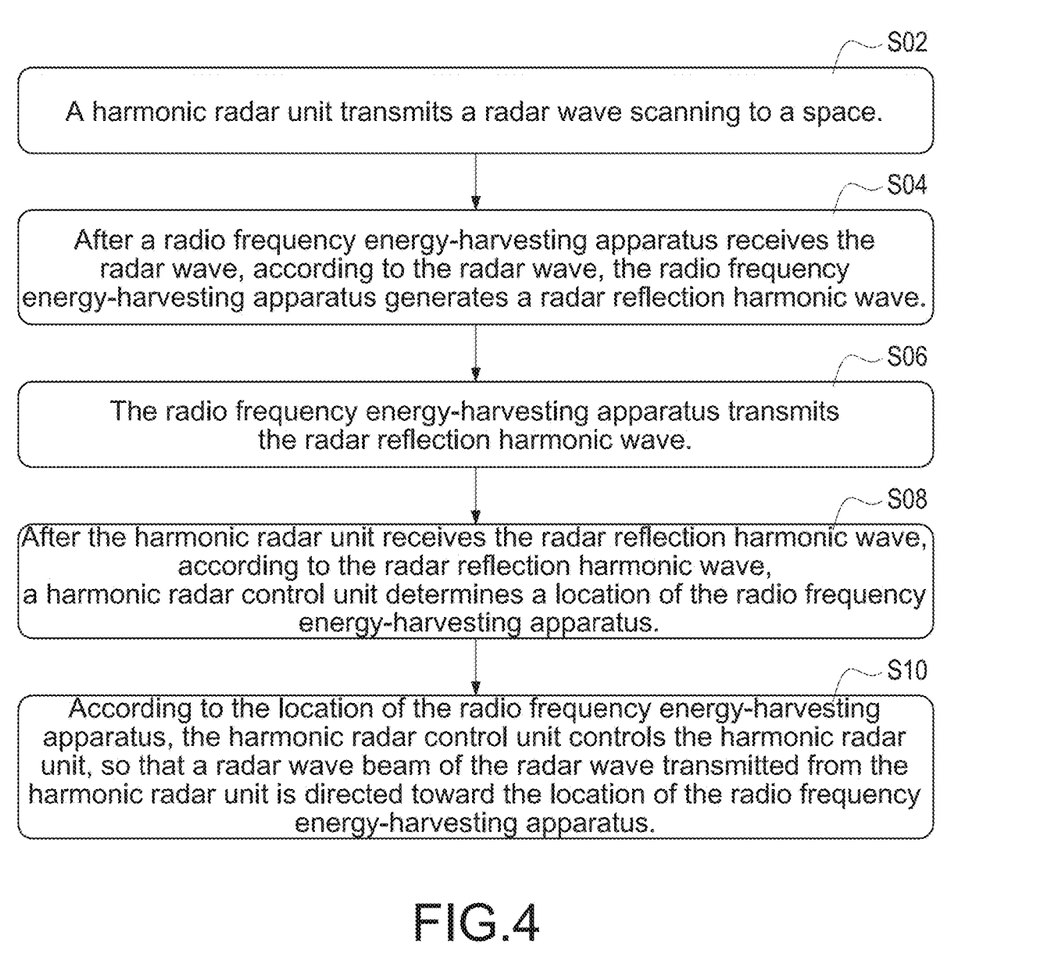
FIG. 4 shows a flow chart of the radio frequency energy-transmitting method of the present invention.

FIG. 4 shows a flow chart of the radio frequency energy-transmitting method of the present invention. The radio frequency energy-transmitting method at least comprises following steps.

S02: A harmonic radar unit transmits a radar wave scanning to a space.

S04: After a radio frequency energy-harvesting apparatus receives the radar wave, according to the radar wave, the radio frequency energy-harvesting apparatus generates a radar reflection harmonic wave.

S06: The radio frequency energy-harvesting apparatus transmits the radar reflection harmonic wave.

S08: After the harmonic radar unit receives the radar reflection harmonic wave, according to the radar reflection harmonic wave, a harmonic radar control unit determines a location of the radio frequency energy-harvesting apparatus.

S10: According to the location of the radio frequency energy-harvesting apparatus, the harmonic radar control unit controls the harmonic radar unit, so that a radar wave beam of the radar wave transmitted from the harmonic radar unit is directed toward the location of the radio frequency energy-harvesting apparatus.

A frequency of the radar reflection harmonic wave is different from a frequency of the radar wave. For example, the frequency of the radar reflection harmonic wave is an integral multiple frequency of the radar wave. For another example, the frequency of the radar reflection harmonic wave is a double frequency of the radar wave.

Moreover, in the step S08, the harmonic radar unit scans and records power intensities of a plurality of radar electric waves. If the power intensity of the radar electric wave is greater than a background harmonic power intensity a power predetermined value (for example, 3 dBm), the harmonic radar unit determines that the radar electric wave is the radar reflection harmonic wave. If the power intensity of the radar electric wave is not greater than the background harmonic power intensity the power predetermined value, the harmonic radar unit determines that the radar electric wave is not the radar reflection harmonic wave, and then the harmonic radar unit eliminates the radar electric wave. The power predetermined value can be set. Moreover, the harmonic radar unit scans the space, records the power intensities of the reflected harmonic waves which are received, and records the phase delay module setting values, and then follows the steps mentioned above to detect the location of the radio frequency energy-harvesting apparatus.

Moreover, in another embodiment, plural radio frequency energy-harvesting apparatuses are located in the space at the same time. At this time, the power predetermined value can be set, so that the radar wave beam of the radar wave transmitted from the harmonic radar unit is directed toward the locations of the radio frequency energy-harvesting apparatuses, wherein the power intensities of the radar electric waves transmitted from the radio frequency energy-harvesting apparatuses are greater than the background harmonic power intensity the power predetermined value.

The nonlinear harmonic components of the harmonic radar unit may leak out to the harmonic receiving antenna 312 as shown in FIG. 1. This is called the background harmonic noise. The radar electric waves may include the background harmonic noise, the radar reflection harmonic wave and other reflected waves from other objects. However, the background harmonic noise and the other reflected waves from other objects have to be eliminated. Only the radar reflection harmonic wave can provide the location information of the radio frequency energy-harvesting apparatus.

The other content of the radio frequency energy-transmitting method of the present invention is similar to those shown in FIGS. 1-3, so that it is not repeated here for brevity. Moreover, please refer to FIG. 1 again. The radio frequency energy-transmitting apparatus 10 added by the radio frequency energy-harvesting apparatus 20 can be named as a radio frequency energy-transmitting system with the location detection function.

The present invention has at least following advantages:

1. The radar wave beam of the radar wave transmitted from the radio frequency energy-transmitting apparatus is directed toward the location of the radio frequency energy-harvesting apparatus, so that the energy density of the location of the radio frequency energy-harvesting apparatus is higher, so that the radio frequency energy-harvesting apparatus obtains higher energy.

2. According to the concept of the radar reflection harmonic wave, the radio frequency energy-transmitting apparatus can detect the location of the radio frequency energy-harvesting apparatus easily, so that the circuit structure of the radio frequency energy-harvesting apparatus is simple and energy is saved to accord with the concept of the energy-harvesting apparatus. The present invention does not need the GPS, Beacon or Wi-Fi communication components to locate the radio frequency energy-harvesting apparatus.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A radio frequency energy-harvesting apparatus applied to a radio frequency energy-transmitting apparatus with a location detection function, the radio frequency energy-harvesting apparatus comprising:
a direct current signal receiving-processing unit;
a rectification and harmonic generation unit electrically connected to the direct current signal receiving-processing unit; and
a radar wave receiving-transmitting unit comprising:
a matching circuit electrically connected to the rectification and harmonic generation unit,
a first selection switch electrically connected to the matching circuit; and
a second selection switch electrically connected to the matching circuit and the rectification and harmonic generation unit;
wherein the radio frequency energy-transmitting apparatus transmits a radar wave scanning to a space; after the radar wave receiving-transmitting unit receives the radar wave, according to the radar wave, the matching circuit of the radar wave receiving-transmitting unit processes the radar wave in a harmonic optimization matching or in an energy-harvesting optimization matching to generate an alternating current signal; the matching circuit of the radar wave receiving-transmitting unit transmits the alternating current signal to the rectification and harmonic generation unit; the rectification and harmonic generation unit generates a radar reflection harmonic wave and a direct current signal; a frequency of the radar reflection harmonic wave is different from a frequency of the radar wave, and the frequency of the radar reflection harmonic wave is a double frequency of the radar wave; the rectification and harmonic generation unit transmits the radar reflection harmonic wave to the radio frequency energy-transmitting apparatus through the radar wave receiving-transmitting unit; the rectification and harmonic generation unit transmits the direct current signal to the direct current signal receiving-processing unit,
wherein the matching circuit comprises:
a harmonic optimization matching sub-circuit electrically connected to the first selection switch and the second selection switch; and
an energy-harvesting optimization matching sub-circuit electrically connected to the first selection switch and the second selection switch, and
wherein if the direct current signal is less than a predetermined value, the first selection switch and the second selection switch are controlled, so that the harmonic optimization matching sub-circuit receives the radar wave, and if the direct current signal is greater than or equal to the predetermined value, the first selection switch and the second selection switch are controlled, so that the energy-harvesting optimization matching sub-circuit receives the radar wave.

2. The radio frequency energy-harvesting apparatus in claim 1,
wherein the radar wave receiving-transmitting unit further comprises:
a radar wave receiving antenna electrically connected to the first selection switch; and
a harmonic transmitting antenna electrically connected to the second selection switch and the rectification and harmonic generation unit, and
wherein the radar wave receiving antenna receives the radar wave and transmits the radar wave to the matching circuit through the first selection switch; the rectification and harmonic generation unit transmits the radar reflection harmonic wave to the radio frequency energy-transmitting apparatus through the harmonic transmitting antenna.

3. The radio frequency energy-harvesting apparatus in claim 2, wherein the rectification and harmonic generation unit is a bridge rectifier.

4. The radio frequency energy-harvesting apparatus in claim 3 further comprising:
a low pass filter electrically connected to the rectification and harmonic generation unit and the direct current signal receiving-processing unit; and
a selection switch controller electrically connected to the low pass filter, the first selection switch and the second selection switch,
wherein the selection switch controller controls the first selection switch and the second selection switch.

5. The radio frequency energy-harvesting apparatus in claim 4, wherein the radar wave receiving antenna and the harmonic transmitting antenna are integrated as a dual-mode antenna.